United States Patent
Sun

(10) Patent No.: US 11,451,417 B1
(45) Date of Patent: Sep. 20, 2022

(54) POWER-EFFICIENT NONLINEAR EQUALIZERS AND METHODS

(71) Applicant: CREDO TECHNOLOGY GROUP LTD, Grand Cayman (KY)

(72) Inventor: Junqing (Phil) Sun, Fremont, CA (US)

(73) Assignee: CREDO TECHNOLOGY GROUP LTD, Grand Cayman (KY)

( * ) Notice: Subject to any disclaimer, the term of this patent is extended or adjusted under 35 U.S.C. 154(b) by 0 days.

(21) Appl. No.: 17/443,078

(22) Filed: Jul. 20, 2021

(51) Int. Cl.
*H04L 25/03* (2006.01)

(52) U.S. Cl.
CPC .. *H04L 25/03057* (2013.01); *H04L 25/03267* (2013.01)

(58) Field of Classification Search
CPC ........... H03H 17/0027; H03H 17/0036; H03H 17/0201; H03H 17/0202; H03H 17/04; H03H 2017/008; H03H 2017/009; H03H 2017/021; H04L 25/03006; H04L 25/03019; H04L 25/03082; H04L 25/03114; H04L 25/03146; H04L 25/03267
USPC ........................... 375/232, 233; 708/322, 323
See application file for complete search history.

(56) References Cited

U.S. PATENT DOCUMENTS

| | | | | |
|---|---|---|---|---|
| 7,130,366 | B2 * | 10/2006 | Phanse | H04B 10/6971 375/232 |
| 9,973,358 | B1 * | 5/2018 | Mohammed | H04L 25/03159 |
| 10,212,260 | B2 | 2/2019 | Sun | |
| 10,491,432 | B1 * | 11/2019 | Medra | H04B 1/16 |
| 2008/0069198 | A1 * | 3/2008 | Bhoja | H04L 7/0334 375/233 |
| 2016/0352557 | A1 * | 12/2016 | Liao | H04L 25/03057 |
| 2020/0106648 | A1 * | 4/2020 | Medra | H04L 25/03146 |
| 2021/0288845 | A1 * | 9/2021 | Ganesan | H04L 25/03057 |

OTHER PUBLICATIONS

U.S. Appl. No. 16/691,523, filed Nov. 21, 2019 and titled: Multi-function Level Finder for SerDes.
Gotoda, M., & Kajikawa, Y. Low computational complexity realization for Volterra Filters (Kansai University)—Asia-Pacific Signal and Information Processing Association (APSIPA). Dec. 14, 2010. Retrieved Apr. 26, 2022, from http://www.apsipa.org/proceedings_2010/pdf/APSIPA143.pdf.

* cited by examiner

*Primary Examiner* — Young T. Tse
(74) *Attorney, Agent, or Firm* — Ramey LLP; Daniel J. Krueger

(57) ABSTRACT

One illustrative equalizer converts a receive signal into a sequence of symbol decisions using: a linear filter that filters the receive signal as part of deriving a first sequence of equalized signal samples; a first decision element that derives a tentative sequence of symbol decisions from the first sequence of equalized signal samples; a nonlinear filter that, when enabled, applies nonlinear compensation to the linearly filtered receive signal as part of deriving a second sequence of equalized signal samples; a second decision element that, when enabled, derives replacement symbol decisions from the second sequence of equalized signal samples; a subtraction element that calculates an equalization error for each symbol decision in the tentative sequence; and a controller that selectively enables the nonlinear filter and the second decision element to obtain a replacement symbol decision for each symbol decision in the tentative sequence having an equalization error greater than a predetermined value.

20 Claims, 5 Drawing Sheets

FIG. 1
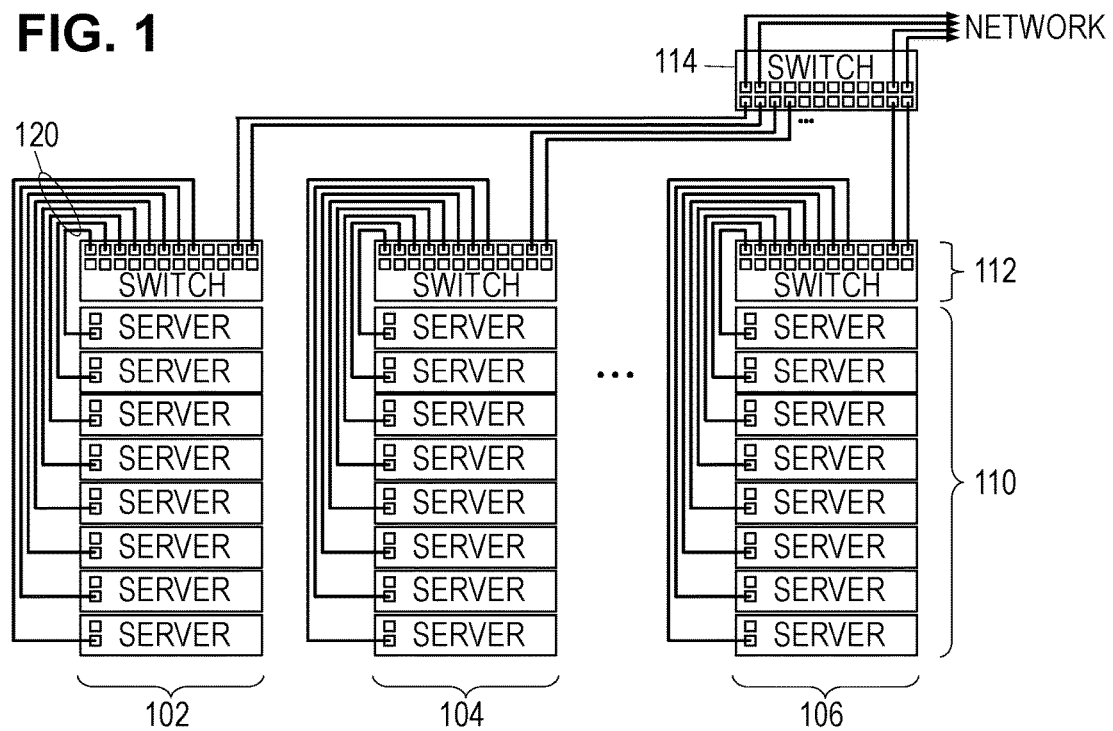
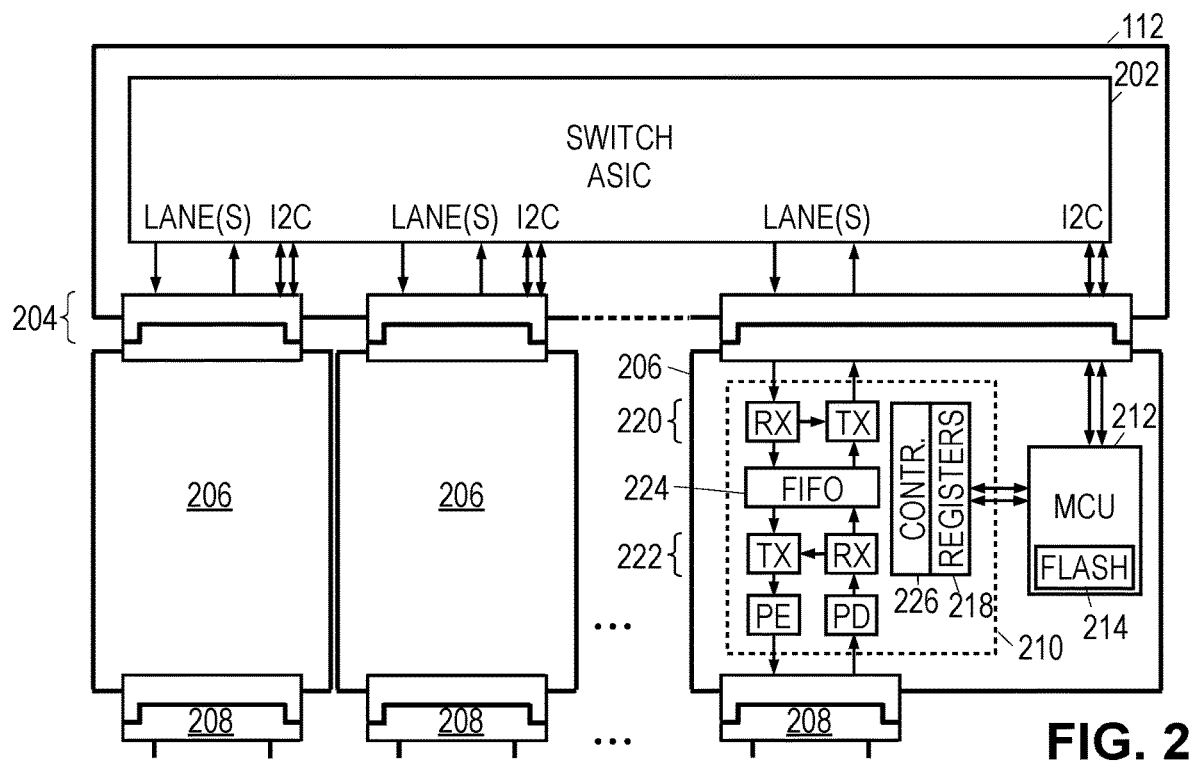
FIG. 2

POWER-EFFICIENT NONLINEAR EQUALIZERS AND METHODS

TECHNICAL FIELD

The present disclosure relates to digital communications receivers and, more particularly, to equalizers that can compensate for nonlinear channel effects without unduly increasing the power budget.

BACKGROUND

As demand continues for ever-lower latencies and ever-higher transfer rates, data communications standards are specifying increasing numbers of data lanes, increasing channel symbol rates in each lane, and increasing numbers of bits per channel symbol. As data transfer rates are pushed ever nearer the physical limits of the channel, channel non-idealities become increasingly significant considerations necessitating transmit-side and/or receive-side equalization to counteract such effects. In many communications channels, such as fiberoptic channels, the channel non-idealities are nonlinear, meaning that the output signal from the channel is not well represented by a linear convolution of a channel response function with the input signal.

Depending on the severity of the channel nonlinearity, there exist equalizers and methods to counteract effects of nonlinear channels including, e.g., Volterra filters. See, e.g., Gotoda and Kajikawa, "Low computational complexity realization for Volterra filters", Proceedings of 2nd APSIPA Annual Summit, pp. 729-732, Singapore, December 2010. Unlike linear filters, which require O(n) operations where n is the filter length, Volterra filters require a number of operations that grows quadratically (2nd order filter) or cubically (3rd order filter) or more with the length of the filter, dramatically expanding the power requirements of such filters. The power budget limitations of high speed digital communications systems have previously rendered nonlinear equalizers infeasible.

SUMMARY

Accordingly, there are disclosed herein power-efficient nonlinear equalizers and methods. One illustrative equalizer converts a receive signal into a sequence of symbol decisions using: a linear filter that obtains a filtered signal from the receive signal as part of deriving a first sequence of equalized signal samples from the receive signal; a first decision element that derives a tentative sequence of symbol decisions from the first sequence of equalized signal samples; a nonlinear filter that, when enabled, operates on both the receive signal and the filtered signal as part of deriving a second sequence of equalized signal samples from the receive signal; a second decision element that, when enabled, derives replacement symbol decisions from the second sequence of equalized signal samples; a subtraction element that calculates an equalization error for each symbol decision in the tentative sequence; and a controller that selectively enables the nonlinear filter and the second decision element to obtain a replacement symbol decision for each symbol decision in the tentative sequence having an equalization error greater than a predetermined value.

An illustrative equalization method converts a receive signal into a sequence of symbol decisions by: using a linear filter on the receive signal to derive a first sequence of equalized signal samples; deriving a tentative sequence of symbol decisions from the first sequence of equalized signal samples; using a nonlinear filter that, when enabled, on the receive signal, optionally deriving higher-order components to be combined with an output of the linear filter as part of obtaining a second sequence of equalized signal samples; using a decision element that, when enabled, derives replacement symbol decisions from the second sequence of equalized signal samples; calculating an equalization error for each symbol decision in the tentative sequence; and selectively enabling the nonlinear filter and the decision element to obtain a replacement symbol decision for each symbol decision in the tentative sequence having an equalization error greater than a predetermined value.

An illustrative semiconductor intellectual property core generates circuitry for implementing an equalizer and method as described above.

Each of the foregoing equalizer, method, and core implementations may be embodied individually or conjointly and may be combined with any one or more of the following optional features: 1. a feedback filter that derives a feedback signal from the tentative sequence of symbol decisions. 2. a summer that combines the feedback signal with an output of the linear filter to provide the first sequence of equalized signal samples. 3. a second summer that combines the feedback signal with an output of the nonlinear filter to provide the second sequence of equalized signal samples. 4. the predetermined value corresponds to an estimated probability of $10^{-2}$ or less. 5. the nonlinear filter combines an output of the linear filter with second order combinations of receive signal samples. 6. the nonlinear filter derives the second sequence of equalized signal samples as a weighted sum of inputs to the nonlinear filter. 7. the nonlinear filter includes one or more delay chains to make a pool of available second order combinations. 8. the nonlinear filter includes multiplexers to select a subset of the available second order combinations to derive the second sequence of equalized signal samples.

BRIEF DESCRIPTION OF THE DRAWINGS

FIG. 1 shows an illustrative network.
FIG. 2 is a block diagram of an illustrative switch.

DETAILED DESCRIPTION

Figure 3:
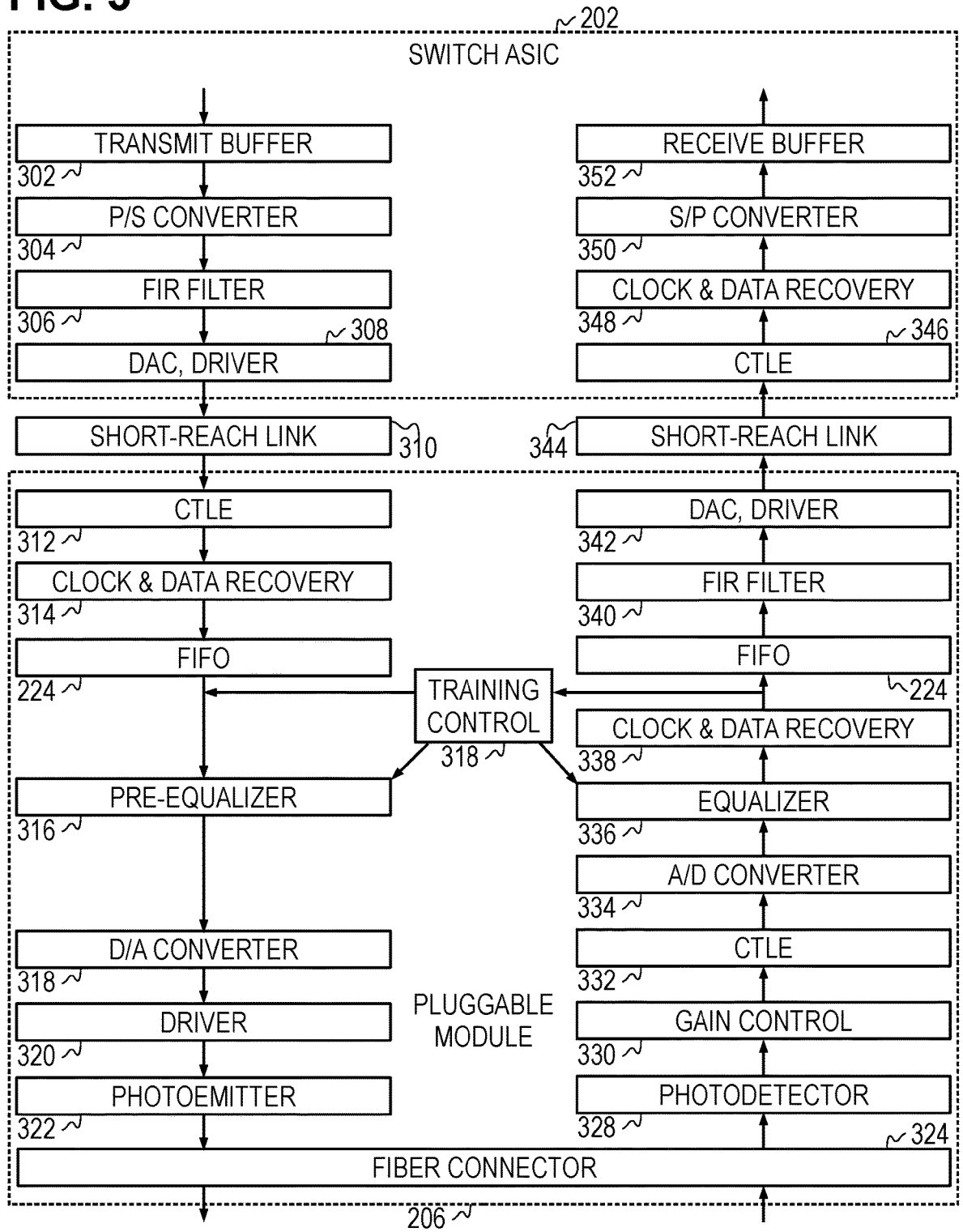
FIG. 3 is a block diagram of an illustrative switch port.

While specific embodiments are given in the drawings and the following description, keep in mind that they do not limit the disclosure. On the contrary, they provide the foundation for one of ordinary skill to discern the alternative forms, equivalents, and modifications that are encompassed in the scope of the appended claims.

For context, FIG. 1 shows an illustrative network such as might be found in a data processing center, with multiple server racks 102-106 each containing multiple servers 110 and at least one "top of rack" (TOR) switch 112. The TOR switches 112 are connected to aggregator switches 114 for interconnectivity and connection to the regional network and internet. (As used herein, the term "switch" includes not just traditional network switches, but also routers, network bridges, hubs, and other devices that forward network communication packets between ports.) Each of the servers 110 is connected to the TOR switches 112 by network cables 120, which may convey signals with symbol rates high enough for nonlinear effects of the channels to become significant.

FIG. 2 shows an illustrative switch 112 with an application-specific integrated circuit (ASIC) 202 that implements packet-switching functionality coupled to port connectors 204 for pluggable modules 206. Pluggable modules 206 couple between the port connectors 204 and cable connectors 208, to improve communications performance by way of equalization and optional format conversion (e.g., converting between electrical and optical signals). The pluggable modules 206 may comply with any one of various pluggable module standards including SFP, SFP-DD, QSFP, QSFP-DD, and OSFP.

The pluggable modules 206 may each include a retimer chip 210 and a microcontroller chip 212 that controls operation of the retimer chip 210 in accordance with firmware and parameters that may be stored in nonvolatile memory 214. The operating mode and parameters of the pluggable retimer modules 206 may be set via a two wire bus such as I2C or MDIO that connects the microcontroller chip 212 to the host device (e.g., switch 112). The microcontroller chip 212 responds to queries and commands received via the two wire bus, and responsively retrieves information from and saves information to control registers 218 of the retimer chip 210.

Retimer chip 210 includes a host-side transceiver 220 coupled to a line-side transceiver 222 by first-in first-out (FIFO) buffers 224. FIG. 2 shows optional photoemitter (PE) and photodetector (PD) modules to convert between optical line-side signals and electrical host-side signals. Though only a single lane is shown in the figure, the transceivers may support multiple lanes conveyed via multiple corresponding optical fibers or electrical conductors. A controller 226 coordinates the operation of the transceivers in accordance with the control register contents, and may provide for multiple communication phases pursuant to a communications standard such as the Fibre Channel Standard published by the American National Standard for Information Technology Accredited Standards Committee INCITS, which provides phases for link speed negotiation (LSN), equalizer training, and normal operation.

FIG. 3 shows an example of the components making up the transmit (egress) and receive (ingress) chains for one of the switch ports, including the pluggable module 206. Though the components are shown and described here using function blocks, it should be understood that the blocks represent integrated circuit modules that are taught in the academic literature and commercially available as semiconductor IP cores in component libraries of various application specific integrated circuit design software packages and/or implementable as firmware executable by programmable controllers or processing units.

For each lane, the switch ASIC provides a transmit buffer 302 to buffer the digital transmit data, which is typically received in blocks of bits or multi-bit symbols. A parallel-to-serial converter 304 accesses the buffer to produce, in this example, a serialized stream of NRZ (non-return to zero) or PAM4 (4-level pulse amplitude modulation) symbols. Other example implementations may produce a stream of channel-encoded bits or other symbols. The symbol stream is preferably compliant with a standard protocol such as the transmission protocol of the Fibre Channel standard including Transmission Words and Ordered Sets (patterns for special functions such as delimiting frames and aligning lanes).

An optional finite impulse response (FIR) filter 306 may be used to provide pre-emphasis of high frequency components to combat attenuation of the short reach link 310. A digital-to-analog converter (DAC) converts the filtered signal to analog form and a driver 308 supplies sufficient current to convey the transmit signal across the short-reach link 310 to the pluggable module 206. The short-reach link 310 primarily consists of conductive printed circuit board traces coupling the switch ASIC to the pluggable module connector. Though the traces may be limited to, say, less than 500 mm, they may nevertheless be expected to cause significant frequency-dependent attenuation and dispersion at the upper range of signal frequencies contemplated here.

In the pluggable module 206, a continuous time linear equalizer (CTLE) filter 312 cooperates with the optional FIR filter 306 to compensate for the effects of the short-reach link 310. A clock and data recovery (CDR) module 314 operates on the filtered signal to derive a clock signal for sampling and re-digitizing the digital symbol stream. An optional FIFO buffer 224 receives the digital symbol stream from the CDR module. An optional pre-equalizer 316 operates on the digital symbol stream to at least partly compensate for the line-side channel effects. A DAC 318 converts the pre-equalized signal to an analog signal, which the driver 320 for the photoemitter amplifies to drive the photoemitter 322. The fiber connector 324 couples the optical signal from the photoemitter to an optical fiber for conveyance to a remote photodetector and receiver.

We note here that pre-equalization generally increases signal energy in those frequency ranges where the channel signal attenuation is highest, thereby increasing the amount of signal energy dissipation within the channel, in addition to necessitating power consumption by the pre-equalizer 316 itself. For the contemplated channels, however, this increased power consumption is small in comparison to the achievable power savings resulting from associated reductions in receiver complexity, particularly the power savings that can be achieved with the equalizer design.

In the pluggable module 206, the fiber connector 324 further couples optical fibers to associated photodetectors 328, which convert the optical receive signals into electrical form, typically a receive signal current that can be converted to a receive signal voltage by a transimpedance amplifier (TIA). A gain control amplifier 330 applies an adjustable gain to optimize the receive signal range for processing by the subsequent components of the receive chain. A CTLE filter 332 provides anti-aliasing and optional spectral shaping prior to signal digitization by analog-to-digital converter 334. A digital equalizer 336 provides adaptive equalization, cooperating with the remote pre-equalizer to compensate for channel effects. A CDR module 338 derives a sampling clock signal and recovers a receive symbol stream from the equalized signal. An optional FIFO buffer receives the digital receive symbol stream from the CDR module 338.

Pluggable module 206 further includes an optional FIR filter 340 to provide pre-emphasis of high frequency components to combat attenuation of the short reach link 344. A digital-to-analog converter (DAC) converts the filtered signal to analog form and a driver 342 supplies sufficient current to convey the transmit signal across the short-reach link 344 to the ASIC 202, where CTLE filter 346 cooperates with the optional FIR filter 340 to compensate for the effects of the short-reach link 344. A clock and data recovery (CDR) module 348 operates on the filtered signal to derive a sample clock signal for recovering the receive symbol stream. A serial-to-parallel converter 350 stores blocks of the receive symbol stream in a receive buffer 352, enabling the use of lower clock rates by the core circuitry of the ASIC 202.

Pluggable module 206 further includes a training control module 318 to adapt coefficients of the pre-equalizer module 316 and equalizer 336. The training control module 318 may generate a sequence of training frames that take the place of the transmit data stream for the duration of a link speed negotiation and link speed training phases, and may detect equalization errors associated with training frame symbols in the receive data stream. Combining the equalization errors with the training frame symbols, the training controller 318 can adapt the coefficients of a remote pre-equalizer and local equalizer 336 to optimize their combined compensation of the combined receive channel effects. Training controller 318 can communicate the remote pre-equalizer coefficient updates via various backchannel options including, e.g., dedicated fields in the training frames of the transmit symbol stream. Correspondingly, training controller 318 can extract updates for the local pre-equalizer 316 from dedicated fields in the frames of the receive symbol stream. For further details of one illustrative example, see, e.g., co-owned U.S. Pat. No. 10,212,260 "SerDes Architecture with a Hidden Backchannel Protocol", which is hereby incorporated herein by reference.

At the contemplated signaling rates (symbol rates greater than 10 GHz) the optical fibers coupled to the pluggable module are expected to exhibit nonlinear effects, which may be particularly problematic for pulse amplitude modulation with four amplitudes (PAM4) or higher. To counteract the nonlinear effects, receive equalizer 336 and/or pre-equalizer 316 may be configured to employ higher order combinations of the input samples when determining the filter output. It is expected that including second and third order combinations will be sufficient. The receive equalizer may thus include a Volterra filter that calculates an output value $$w_i = \sum_{k=0}^{n-1} h_k y_{i-k} + \sum_{k=0}^{n-1}\sum_{j=0}^{n-1} h_{jk} y_{i-j} y_{i-k} + \sum_{k=0}^{n-1}\sum_{j=0}^{n-1}\sum_{m=0}^{n-1} h_{mjk} y_{i-m} y_{i-j} y_{i-k}$$

where $y_i$ represents the filter input, $h_k$ represents the first order coefficients, $h_{jk}$ represents the second order coefficients, $h_{mjk}$ represents the third order coefficients, and n is the filter length. Certain simplifications may be available, as it is expected that for fiberoptic channels at the contemplated symbol rates, only four to eight of the second order coefficients $h_{jk}$ will be significant and perhaps only two to four of the third order coefficients $h_{mjk}$ will be non-negligible.

Figure 4:
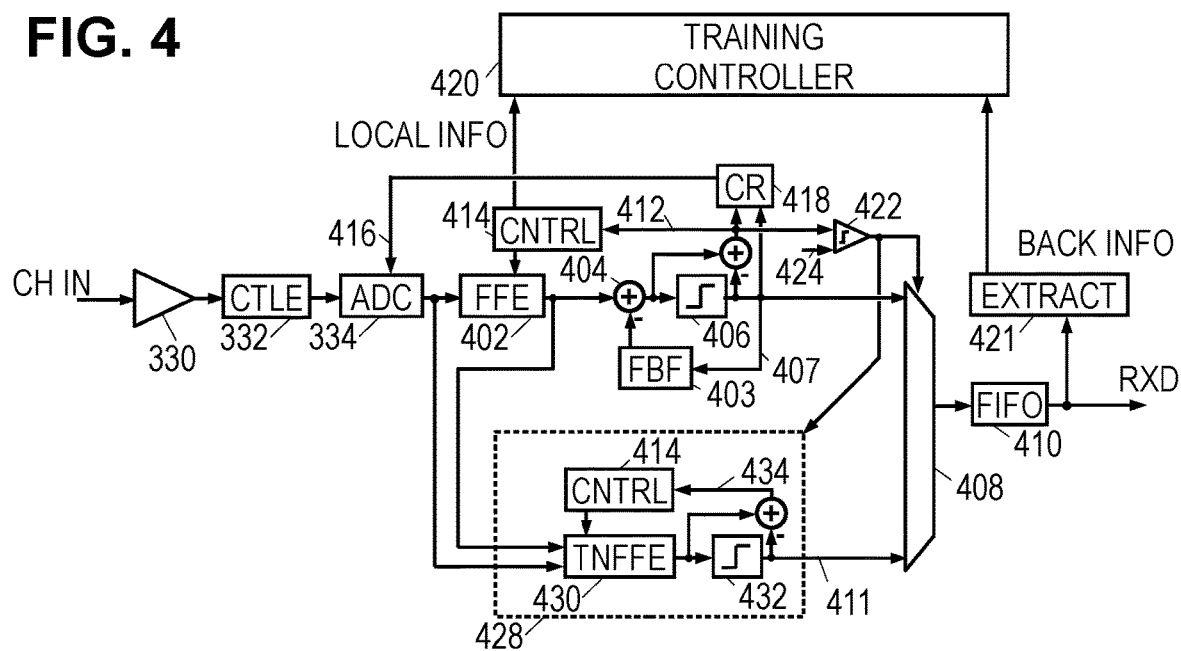
FIG. 4 is a block diagram of an illustrative receiver.

FIG. 4 provides additional detail regarding an illustrative implementation of equalizer 336, CDR module 338, and training control module 318. In FIG. 4, an analog electrical signal (CH_IN) from photodetector 328 is amplified by gain controller 330, filtered by CTLE 332, and digitized by ADC 334 using a sampling clock 416. A digital feed-forward equalization (FFE) filter 402 may be used to reduce intersymbol interference in the digitized receive signal, producing a filtered signal. Optionally, a feedback filter (FBF) 403 produces a feedback signal that a summer 404 combines with the filtered signal to provide an equalized signal to a decision element 406. Alternatively, the filtered signal from FFE filter 402 may be supplied directly to the decision element 406 as the equalized signal.

Decision element 406 operates on the equalized signal, comparing it to one or more decision thresholds to identify the channel symbol that the equalized signal represents. The FBF 403 derives the feedback signal from the sequence of symbol decisions 407 to correct for trailing intersymbol interference. This equalization and detection arrangement is known as decision feedback equalization (DFE), and it yields a first sequence of symbol decisions, which a multiplexer 408 supplies to a first-in first-out (FIFO) buffer 410 unless certain symbol decisions are selected for replacement, in which case the multiplexer 408 substitutes corresponding symbol decisions from a replacement decision sequence 411. The FIFO buffer contents are provided for output as a receive data (RXD) signal.

The input and output of decision element 406 may be differenced to provide an equalization error signal 412 for use by a controller 414 and a clock recovery module 418. The controller 414 uses the equalization error signal 412 combined with the filter inputs to optimize coefficients of the FFE 402 and FBF 403. The clock recovery module 418 uses the error signal, usually in combination with the symbol decisions 407, to derive the sampling clock signal 416.

The equalization error signal 412 may be used to control the multiplexer 408. As explained further below, when the equalization error signal 412 exceeds a threshold value 424, it will be preferable to replace those symbol decisions which were obtained with a linear filter and/or DFE, with replacement symbol decisions obtained by a nonlinear equalizer. Accordingly, a comparator compares the equalization error signal 412 to the threshold value 424, asserting a selection signal causing multiplexer 408 to substitute replacement symbol decisions for the corresponding symbol decisions in sequence 407. Though shown as preceding the FIFO buffer 410 for explanatory purposes, the multiplexer 408 may be implemented as a substitution to symbol decisions already stored in the FIFO buffer 410.

The selection signal from comparator 422 further serves as an enable signal for a turbo nonlinear equalizer 428 to retrospectively generate the replacement symbol decisions 411. (The present disclosure uses the term "turbo" to refer to components that enhance performance but which are enabled only as needed.) Nonlinear equalizer 428 includes a turbo nonlinear FFE (TNFFE) filter 430 that operates on the digital receive signal when necessary and applies nonlinear compensation to the filtered signal from FFE filter 402 to provide a nonlinearly-equalized signal to a second decision element 432. Although not shown here, a feedback filter could be employed in nonlinear equalizer 428 to provide decision feedback equalization as described previously for the default mode of operation. Decision element 432 compares the equalized signal to one or more decision thresholds to identify the channel symbol that the equalized signal represents.

As before, the input and output of the decision element 432 may be differenced to generate a second equalization error signal 434, which may be used by the controller 414 during training to determine which inputs from a pool of available filter inputs to use, and to further adapt the associated TNFFE filter coefficients to minimize the equalization error signal. The sequence of symbol decisions 411 produced by decision element 432 is supplied to multiplexer 408 for possible substitutions of symbol decisions in sequence 407.

FIFO buffer 410 stores the digital data stream bits or symbols for retransmission across short-reach link 344. The received data stream may be structured as a sequence of frames each having a header and a payload. One or more fields in the frame headers may contain backchannel information, and if so, the extraction module 421 detects those fields and extracts the backchannel information for local use. As one example, the backchannel information may include adaptation information for the pre-equalization filter 316.

In addition to optimizing FFE and FBF coefficients, the controller 414 may further determine adjustments for the CTLE filter 332 and for the remote transmit, or "pre-equalization", filter. The controller 414 outputs locally-generated information (LOCAL_INFO), which includes the transmit filter coefficient adjustments and the convergence status. Where the system supports the use of a backchannel, the LOCAL_INFO is supplied to training controller 420 for communicating in the reverse direction on the data lane. Training control module 318 (FIG. 3) communicates the transmit filter adjustments and the convergence status via the backchannel to the source of the CH_IN signal. In that vein, the received signal includes back-channel information from the source of the CH_IN signal. The extraction module 421 detects the back-channel information (BACK_INFO) and passes it to the training controller 420. Once convergence is achieved, the receive chain is ready for normal operation.

Training controller 420 (part of training control module 318) receives the BACK INFO and LOCAL INFO. During normal operations, a multiplexer supplies the transmit data stream to pre-equalizer 316 with unmodified frame headers, but during the link speed negotiation and equalizer training phases, the multiplexer may introduce modified frame headers into the transmit data stream. During these phases, the transmit data stream comprises a training signal, and the header has fields for the backchannel information including convergence status and transmit filter coefficient adjustments (LOCAL_INFO) received from controller 414. Note that even after the local receiver indicates filter convergence has occurred, the training controller 420 may prolong the training phase to coordinate training phase timing across each link of the channel.

The training controller 420 further accepts any back-channel information (BACK_INFO) extracted by module 421 from received training frames sent by the remote node. The training controller 420 applies the corresponding adjustments to the coefficients of transmit filter 316.

Though not expressly shown here, it is expected that the filters may be parallelized, and the receiver augmented with one or more level finders to aid in determining decision thresholds and cumulative probability distributions for signals at upper and lower edges of the equalized signal decision eyes. Implementation and configuration detail for such features can be found in co-owned U.S. application Ser. No. 16/691,523, filed 2019 Nov. 21 and titled "Multi-function level finder for SerDes", which is hereby incorporated herein by reference.

Figure 5A:
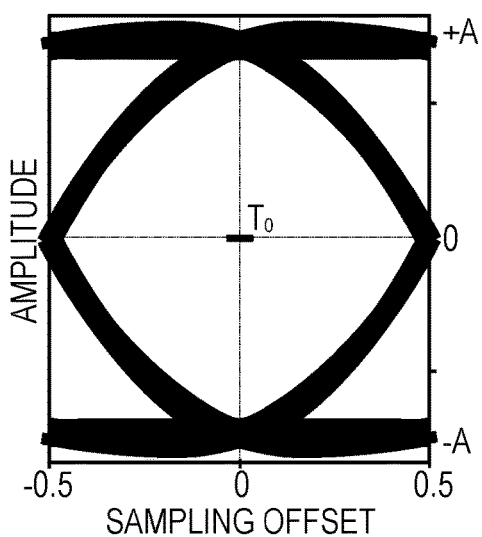
FIG. 5A is an illustrative NRZ (aka PAM2) eye diagram.
Figure 5B:
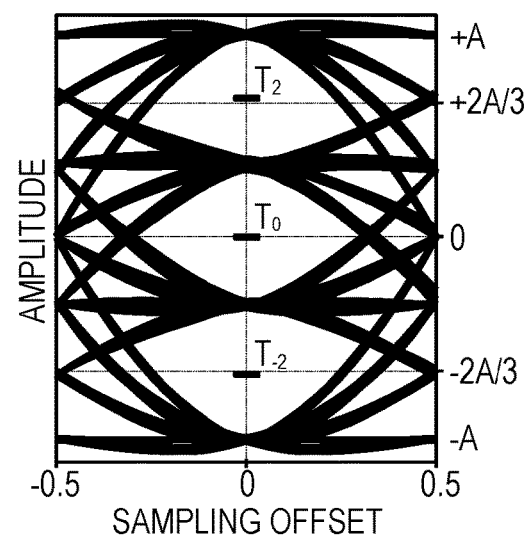
FIG. 5B is an illustrative PAM4 eye diagram.

FIG. 5A is an illustrative nonreturn-to-zero (NRZ) eye diagram showing a decision threshold $T_0$ midway between the ±A equalized signal values corresponding to the two channel symbols (−1, +1). FIG. 5B is an illustrative PAM4 diagram with three decision thresholds $T_{-2}$, $T_0$, $T_2$, to distinguish between the four potential symbol values (−3, −1, +1, +3). Where the minimum and maximum equalized signal target values at the sampling instants are −A and +A, the decision thresholds are nominally set at 0 and ±2 A/3. Noise, interference, and other channel effects cause variation in the signal, spreading the signal paths and reducing the size of the eyes, thereby increasing the probability of error.

Figure 6:
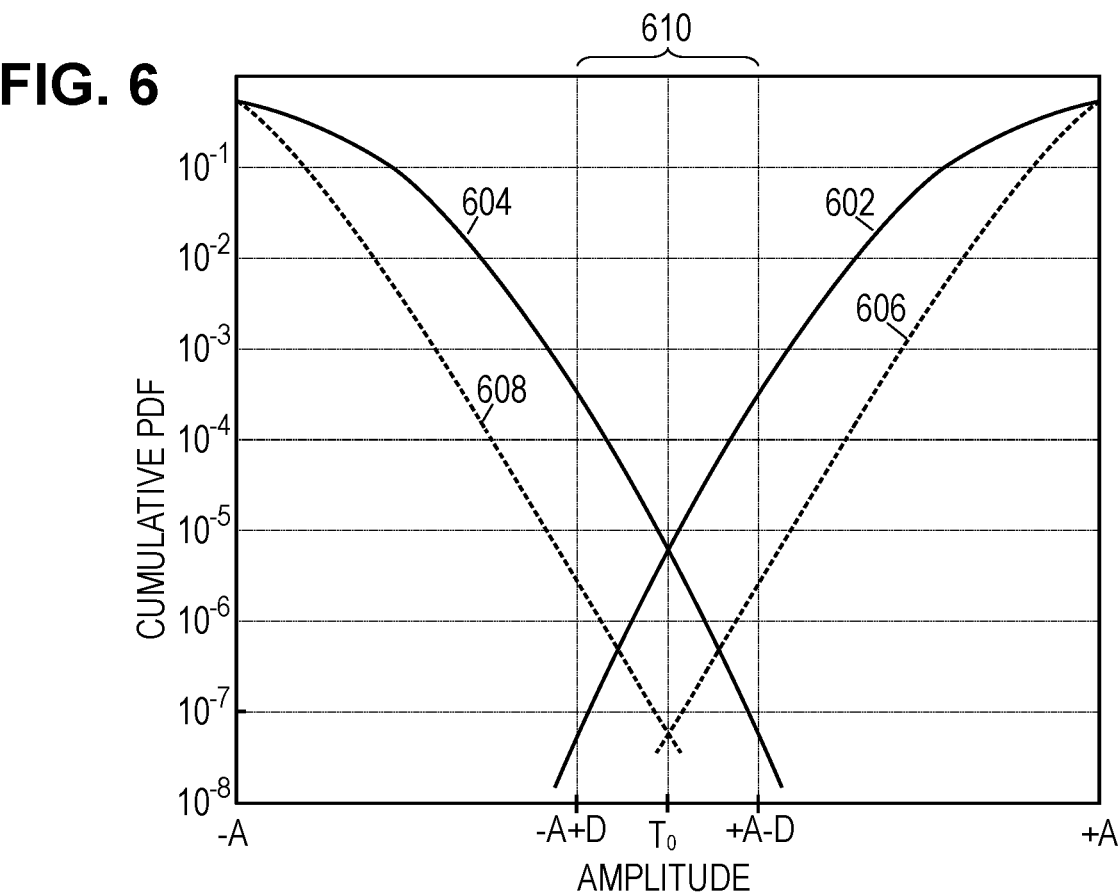
FIG. 6 is a graph showing illustrative cumulative probability distributions for the equalized signal.

FIG. 6 illustrates the signal spreading with cumulative probability distribution graphs. Line 602 is the probability that, at the optimal sampling time, the equalized signal value exceeds a given amplitude for a +1 channel symbol. Line 604 is the probability that the equalized signal value falls below the given amplitude for a −1 channel symbol. These lines cross the decision threshold at about $10^{-5}$, indicating an approximate probability of symbol decision error in this range. (This analysis does not account for error bursts.) Lines 602, 604 represent the level of equalization that may be achievable with linear filters in high speed fiberoptic channels. While this error level may be adequate for many applications, it is desired to achieve error rates of $10^{-7}$ or less for most computer networking applications. Lines 606, 608 represent the corresponding probabilities that may be achievable using nonlinear filters. As noted above, however, the nonlinear filters may have substantially higher power requirements than the linear filters, making it infeasible to always use them.

To achieve the performance of nonlinear filters without incurring the associated power requirement penalty, the present disclosure enables the nonlinear filter only when the magnitude of the equalization error exceeds a threshold value D, i.e., when the equalized signal falls within the transition region 610. In FIG. 6, the threshold value D is 0.79 A, requiring the nonlinear filter to be enabled when the equalization error is greater than about 80% of A. Lines 602, 604 indicate that this level of equalization error occurs less than 0.1% of the time, meaning that the nonlinear filter remains disabled 99.9% of the time, substantially reducing its average power requirements. To minimize the power requirements, it is desirable to set the error threshold D as high as possible subject to the requirement that the probability of an incorrect symbol decision using the linear filter does not exceed the target error rate (e.g., $10^{-7}$ or less). Because line 602 crosses $10^{-7}$ at the −A+D amplitude value at −0.18 A, D cannot be set any higher than about 0.82 A without suffering an error rate penalty. Conversely, setting D lower than necessary would increase the percentage of time that the nonlinear filter is enabled. If D is set at about 0.35 A, the curves in FIG. 6 indicate the nonlinear filters would be enabled at least 10% of the time, which may be insufficient to make their usage feasible.

Figure 7:
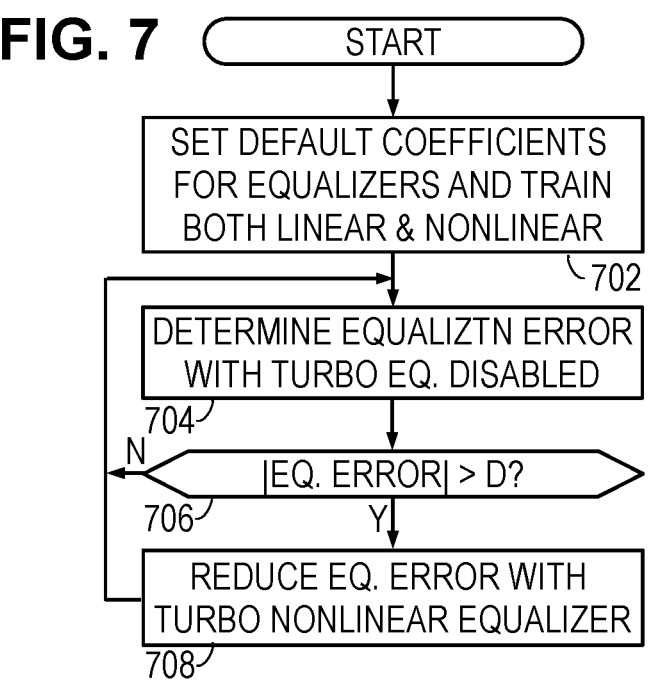
FIG. 7 is a flow diagram of an illustrative equalization method.

FIG. 7 is a flow diagram of an illustrative equalization method. In block 702 the controller sets default coefficients for the default equalizer and the turbo equalizer using a nonlinear filter, and conducts training to adapt the coefficients. As described further below, the nonlinear filter may include multiplexers to select from a pool of available filter inputs. Before optimizing the coefficients, the controller may use the level finder to estimate the contribution of each term and set the multiplexers to select those terms having the largest contributions.

Once training is complete, the receiver enters normal operations. In block 704, the turbo equalizer with nonlinear filter is disabled, and the receiver employs the default equalizer to obtain symbol decisions and determine equalization error. In block 706, the receiver determines whether the magnitude of the equalization error is greater than the predetermined threshold. If not, the receiver repeats block 704. Otherwise in block 708, the receiver enables the turbo equalizer with nonlinear filter to reduce equalization error and obtain more reliable symbol decisions.

Figure 8:
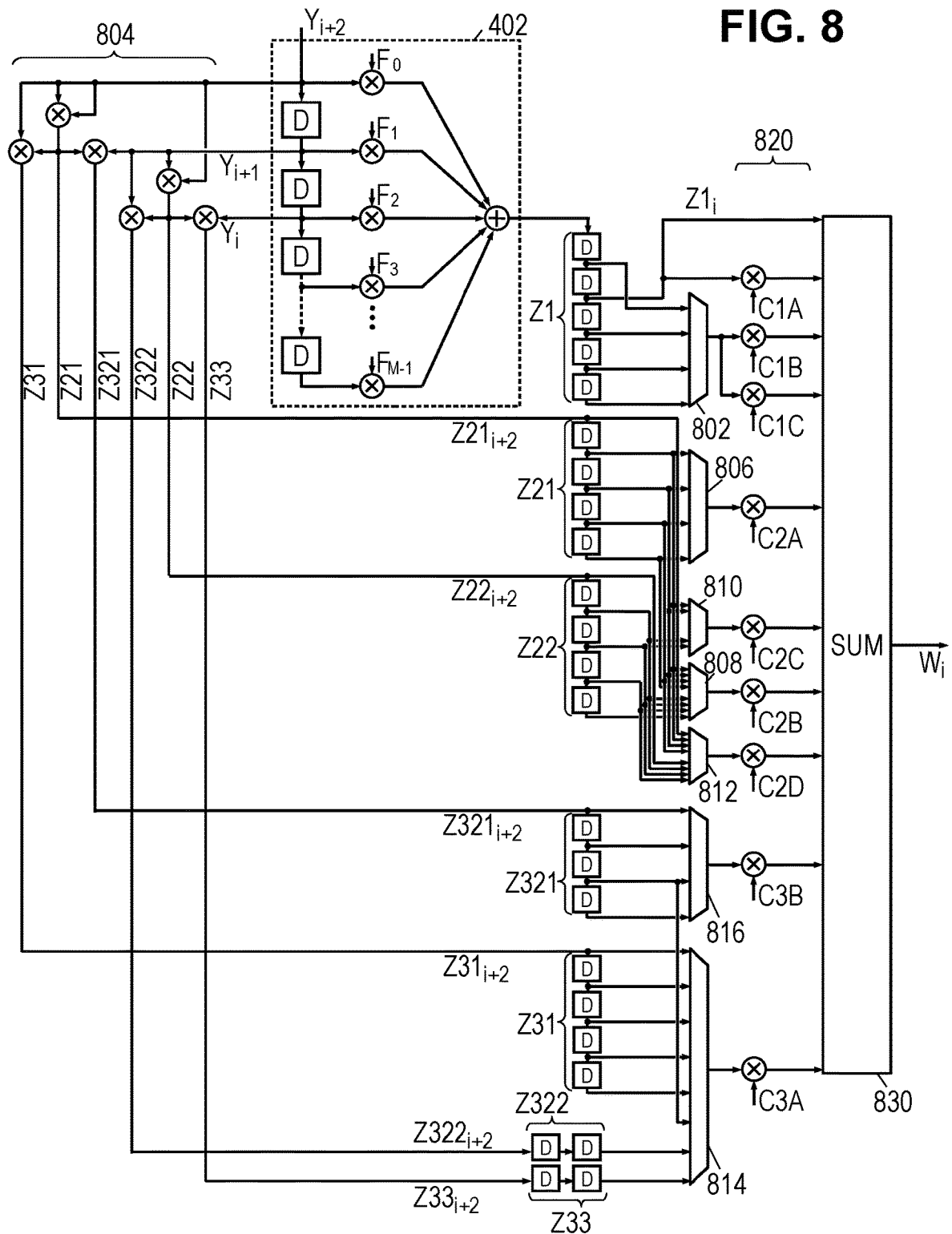
FIG. 8 is a block diagram of an illustrative nonlinear equalizer.

FIG. 8 is a block diagram of an illustrative nonlinear equalizer, which may take advantage of the existing components forming FFE 402. A delay chain within FFE 402 stores variously delayed versions of the digitized receive signal $Y_{i-k}$. (Index k is a cursor index relative to a current time sample i.) A set of multipliers scales each of the stored values in the delay chain by a corresponding FFE filter coefficient $F_k$, and the scaled values are summed to provide a (linear) filtered signal $Z1_i$. A "Z1" delay chain provides variously delayed versions of the filtered signal Z1, which a first multiplexer 802 can select from. One of the inputs ($Z1_i$) is also provided directly to a summer 830 and indirectly via a multiplier 820 with a coefficient C1A to provide scaling of the linear filter value. Alternatively, a single multiplier with a potentially larger coefficient range may be used to scale the Z1$i$ input.

A pair of multipliers 820 scale the Z1 delay chain selection of multiplexer 802 by respective coefficients C1B, C1C for supply to the summer 830. Alternatively, a single multiplier with a potentially larger coefficient range could be used to scale the selected Z1 delay chain selection. As previously mentioned, a controller sets the multiplexers to select the delay chain values having the largest contributions to the minimization of the equalization error.

To account for potential second and third order nonlinear effects, a set of multipliers 804 determines products of various combinations of the FFE delay chain contents. The combinations calculated in the illustrative turbo equalizer of FIG. 8 are:

$$Z21_i = Y_i * Y_i$$

$$Z22_i = Y_i * Y_{i-1}$$

$$Z31_i = Y_i * Y_i * Y_i$$

$$Z321_i = Y_i * Y_i * Y_{i-1}$$

$$Z322_i = Y_i * Y_{i-1} * Y_{i-1}$$

$$Z33_i = Y_i * Y_{i-1} * Y_{i-2}$$

Six delay chains respectively labeled Z21, Z22, Z31, Z321, Z322, and Z33, provide variously delayed versions of these products. A multiplexer 806 selects one value from the Z21 delay chain to be scaled by a coefficient C2A before being provided to summer 830. Multiplexer 808 selects one value from either the Z21 or the Z22 delay chain to be scaled by a coefficient C2B before being provided to summer 830. Multiplexers 810, 812 are also coupled to the Z21 and Z22 delay chains in an overlapping arrangement with multiplexer 808, and they each select one value each to be scaled by respective coefficients C2C, C2D before being supplied to summer 830. Thus the multiplexers 808-812 can select three second order products for scaling and use by summer 830. Multiplexer 814 is coupled to the Z31, Z321, Z322, and Z33 delay chains to select one third order product for scaling by a coefficient C3A before being supplied to summer 830. Multiplexer 816 is coupled to just the Z321 delay chain to select one value for scaling by coefficient C3B before being supplied to summer 830. Summer 830 sums the scaled values to output the weighted sum Wi, which is the output of the turbo nonlinear FFE 430 (FIG. 4). This output can be supplied directly to a decision element 432 as shown in FIG. 4, or can be first combined with a feedback signal from a feedback filter operating on the symbol decisions of the decision element 432.

The calculated terms in FIG. 8 can vary based on empirically determined significance for the typical channels where the receiver is to be employed, and the number and arrangement of multiplexers can be similarly varied to enable satisfactory compensation of nonlinear effects for those typical channels across the range of environments they may be employed in. Numerous alternative forms, equivalents, and modifications will become apparent to those skilled in the art once the above disclosure is fully appreciated. For example, the equalizers are described herein as digital, but those of ordinary skill would recognize that the principles are also applicable to analog equalizers. It is intended that the claims be interpreted to embrace all such alternative forms, equivalents, and modifications that are encompassed in the scope of the appended claims.

What is claimed is:

1. An equalizer that converts a receive signal into a sequence of symbol decisions, the equalizer comprising:
   a linear filter that obtains a filtered signal from the receive signal as part of deriving a first sequence of equalized signal samples from the receive signal;
   a first decision element that derives a tentative sequence of symbol decisions from the first sequence of equalized signal samples;
   a nonlinear filter that, when enabled, operates on both the receive signal and the filtered signal as part of deriving a second sequence of equalized signal samples from the receive signal;
   a second decision element that, when enabled, derives replacement symbol decisions from the second sequence of equalized signal samples;
   a subtraction element that calculates an equalization error for each symbol decision in the tentative sequence; and
   a controller that selectively enables the nonlinear filter and the second decision element to obtain a replacement symbol decision for each symbol decision in the tentative sequence having an equalization error greater than a predetermined value.

2. The equalizer of claim 1, further comprising:
   a feedback filter that derives a feedback signal from the tentative sequence of symbol decisions; and
   a summer that combines the feedback signal with an output of the linear filter to provide the first sequence of equalized signal samples.

3. The equalizer of claim 2, further comprising:
   a second summer that combines a second feedback signal with an output of the nonlinear filter to provide the second sequence of equalized signal samples.

4. The equalizer of claim 1, wherein the predetermined value corresponds to an estimated probability of $10^{-2}$ or less.

5. The equalizer of claim 1, wherein the nonlinear filter combines an output of the linear filter with second order combinations of receive signal samples.

6. The equalizer of claim 5, wherein the nonlinear filter derives the second sequence of equalized signal samples as a weighed sum of inputs to the nonlinear filter.

7. The equalizer of claim 5, wherein the nonlinear filter includes one or more delay chains to make a pool of available second order combinations, and wherein the nonlinear filter includes multiplexers to select a subset of the available second order combinations to derive the second sequence of equalized signal samples.

8. An equalization method that converts a receive signal into a sequence of symbol decisions, the method comprising:
   using a linear filter on the receive signal to obtain a filtered signal for deriving a first sequence of equalized signal samples;
   deriving a tentative sequence of symbol decisions from the first sequence of equalized signal samples;
   using a nonlinear filter that, when enabled, operates on the receive signal to derive a second sequence of equalized signal samples;
   using a decision element that, when enabled, derives replacement symbol decisions from the second sequence of equalized signal samples;
   calculating an equalization error for each symbol decision in the tentative sequence; and selectively enabling the nonlinear filter and the decision element to obtain a replacement symbol decision for each symbol decision in the tentative sequence having an equalization error greater than a predetermined value.

9. The equalization method of claim 8, further comprising:
deriving a feedback signal from the tentative sequence of symbol decisions; and
combining the feedback signal with an output of the linear filter to provide the first sequence of equalized signal samples.

10. The equalization method of claim 9, further comprising:
combining a second feedback signal with an output of the nonlinear filter to provide the second sequence of equalized signal samples.

11. The equalization method of claim 8, wherein the predetermined value corresponds to an estimated probability of $10^{-2}$ or less.

12. The equalization method of claim 8, wherein the nonlinear filter combines an output of the linear filter with second order combinations of receive signal samples.

13. The equalization method of claim 12, wherein the nonlinear filter derives the second sequence of equalized signal samples as a weighed sum of inputs to the nonlinear filter.

14. The equalization method of claim 12, wherein the nonlinear filter selects a subset of available second order combinations to derive the second sequence of equalized signal samples.

15. A semiconductor intellectual property core that generates circuitry for an equalizer, wherein the equalizer comprises:
a linear filter that operates on a receive signal to obtain a filtered signal as part of deriving a first sequence of equalized signal samples from the receive signal;
a first decision element that derives a tentative sequence of symbol decisions from the first sequence of equalized signal samples;
a nonlinear filter that, when enabled, operates on the receive signal as part of deriving a second sequence of equalized signal samples from the receive signal;
a second decision element that, when enabled, derives replacement symbol decisions from the second sequence of equalized signal samples;
a subtraction element that calculates an equalization error for each symbol decision in the tentative sequence; and
a controller that selectively enables the nonlinear filter and the second decision element to obtain a replacement symbol decision for each symbol decision in the tentative sequence having an equalization error greater than a predetermined value.

16. The semiconductor intellectual property core of claim 15, wherein the equalizer further comprises:
a feedback filter that derives a feedback signal from the tentative sequence of symbol decisions; and
a summer that combines the feedback signal with an output of the linear filter to provide the first sequence of equalized signal samples.

17. The semiconductor intellectual property core of claim 16, wherein the equalizer further comprises:
a second summer that combines a second feedback signal with an output of the nonlinear filter to provide the second sequence of equalized signal samples.

18. The semiconductor intellectual property core of claim 15, wherein the predetermined value corresponds to an estimated probability of $10^{-2}$ or less.

19. The semiconductor intellectual property core of claim 15, wherein the nonlinear filter combines an output of the linear filter with second order combinations of receive signal samples.

20. The semiconductor intellectual property core of claim 19, wherein the nonlinear filter includes one or more delay chains to make a pool of available second order combinations, and wherein the nonlinear filter includes multiplexers to select a subset of the available second order combinations to derive the second sequence of equalized signal samples.

* * * * *